(12) United States Patent
Means et al.

(10) Patent No.: US 7,740,114 B2
(45) Date of Patent: Jun. 22, 2010

(54) BRAKING SHELL FOR SHOPPING CART SECURITY DEVICE

(75) Inventors: Jay S. Means, Escondido, CA (US); Joseph F. Nebolon, Del Mar, CA (US)

(73) Assignee: Carttronics, LLC, San Diego, CA (US)

( * ) Notice: Subject to any disclaimer, the term of this patent is extended or adjusted under 35 U.S.C. 154(b) by 0 days.

(21) Appl. No.: 12/362,332

(22) Filed: Jan. 29, 2009
(Under 37 CFR 1.47)

(65) Prior Publication Data

US 2009/0133972 A1    May 28, 2009

Related U.S. Application Data

(63) Continuation of application No. 11/411,976, filed on Apr. 26, 2006, now abandoned.

(60) Provisional application No. 60/675,295, filed on Apr. 26, 2005.

(51) Int. Cl.
*B60T 1/14* (2006.01)

(52) U.S. Cl. .............. 188/5; 188/1.12; 188/19; 188/32; 188/111

(58) Field of Classification Search ............... 188/1.12, 188/4 R, 4 B, 5, 16, 19, 23, 30, 32, 68, 69, 188/111; 280/33.992, 33.994
See application file for complete search history.

(56) References Cited

U.S. PATENT DOCUMENTS

| | | | | |
|---|---|---|---|---|
| 358,016 A * | 2/1887 | Clark | ........................ | 81/13 |
| 488,812 A * | 12/1892 | Homes | ........................ | 188/4 R |
| 583,371 A * | 5/1897 | Helmon | ........................ | 188/4 R |
| 1,039,687 A * | 10/1912 | Barry et al. | ........................ | 188/5 |
| 1,402,279 A * | 1/1922 | Barber | ........................ | 188/4 R |
| 1,812,806 A * | 6/1931 | Sexton | ........................ | 188/4 R |
| 2,083,631 A * | 6/1937 | Ballard | ........................ | 188/4 R |
| 2,385,689 A * | 9/1945 | Christiansen | ........................ | 188/4 R |
| 2,594,789 A * | 4/1952 | Morin | ........................ | 29/33.2 |
| 2,759,738 A * | 8/1956 | Reiter | ........................ | 280/62 |
| 3,612,200 A * | 10/1971 | Cailyer | ........................ | 188/4 R |
| 5,881,846 A * | 3/1999 | French et al. | ........................ | 188/1.12 |
| 6,481,540 B1 * | 11/2002 | Nolting et al. | ........................ | 188/4 R |
| 2007/0074936 A1 * | 4/2007 | Means et al. | ........................ | 188/5 |

FOREIGN PATENT DOCUMENTS

| | | |
|---|---|---|
| EP | 0067023 A2 | 12/1982 |
| EP | 1101685 A1 | 5/2001 |
| GB | 931156 | 7/1963 |
| JP | 4-000087 A * | 1/1992 |
| JP | 6-114753 A * | 4/1994 |

\* cited by examiner

*Primary Examiner*—Thomas J Williams
(74) *Attorney, Agent, or Firm*—Nydegger & Associates

(57) ABSTRACT

A braking member for rotatable mounting on a wheel axle of a hand-driven wheeled vehicle such as a shopping cart has a first part having an opening for mounting on a wheel axle, and a second part releasably secured to the first part and having a braking surface adapted to engage the ground when the braking member is in an operative position. When the braking member becomes worn, the entire member does not have to be removed from the wheel or caster, but instead the second part is released from the first part while the first part remains on the wheel. The second part can only be released using a special tool which is provided to store personnel.

6 Claims, 6 Drawing Sheets

BRAKING SHELL FOR SHOPPING CART SECURITY DEVICE

This application is a continuation of application Ser. No. 11/411,976, filed Apr. 26, 2006, which is currently pending, and which claims the benefit of U.S. Provisional Patent Application Ser. No. 60/675,295, filed on Apr. 26, 2005. The contents of application Ser. No. 11/411,976 are incorporated herein by reference.

FIELD OF THE INVENTION

The present invention pertains generally to braking systems for wheeled vehicles. More particularly, the present invention pertains to braking systems that can be selectively activated to deter removal of the vehicle from a predetermined area. The present invention is particularly, but not exclusively, useful as a braking system that provides for the selective removal and replacement of worn or inoperative components.

BACKGROUND OF THE INVENTION

The present invention relates generally to security devices for hand-operated wheeled vehicles, such as shopping carts, to deter theft of such vehicles, and is particularly concerned with a braking shell forming part of such a security device which is arranged to be deployed on actuation to rotate down into contact with the ground in order to inhibit wheel rotation.

In U.S. Pat. Nos. 5,881,846 and 6,125,972 of French et al., a shopping cart security apparatus and system is described in which a braking member in the form of a shell is rotatably mounted on the wheel axle of one of the wheels, so as to partially surround the wheel. The shell is movable between a raised, inoperative position in which it does not contact the ground, and a lowered, operative position contacting the ground between the wheel and the ground, preventing rotation of the wheel. One problem with this arrangement is that the portion which contacts the ground, which is generally a skid plate, becomes worn over time and eventually needs to be replaced. This requires the entire caster to be removed from the cart so that the shell can be removed from the wheel axle and replaced or repaired. This makes the cost and time required for maintenance relatively high.

SUMMARY OF THE INVENTION

It is an object of the present invention to provide a new and improved braking shell for a shopping cart security apparatus which is easier to service when the braking or ground engaging portion becomes worn.

According to one aspect of the present invention, a braking member for rotatable mounting on a wheel axle of a hand-driven wheeled vehicle is provided, the member comprising a first part having an opening for mounting on a wheel axle, and a second part releasably secured to the first part and having a braking surface adapted to engage the ground when the braking member is in an operative position. A special tool is required to release the second part from the first part.

The braking member may be in the form of a shell for surrounding part of the wheel when mounted on the wheel axle, the shell having an outer arcuate wall for extending around part of the outer periphery or rim of a wheel on which it is mounted, and parallel side walls for extending over part of the front and rear faces of the wheel. The shell is divided generally transversely into the first shell part and second shell part. A skid plate of metal or other hard-wearing material may be mounted on the outer arcuate wall of the second part of the shell to provide the braking surface. The wheel engaging opening in the first part comprises a pair of aligned holes in the opposite side walls of the shell.

In an exemplary embodiment of the invention, the dividing line between the first and second parts of the shell extends along one side wall at a location spaced to one side of the axle engaging hole, across the outer arcuate wall, and then down the opposite side wall to the lower edge of the shell. The mating edges of the two shell parts at the dividing line may be wavy, serrated, or otherwise non-straight along at least part of the length of the dividing line, so as to make it difficult to insert a prying device in an attempt to separate the two pieces. In the exemplary embodiment, a pair of tongues extend from the mating edges of the opposite side walls of the first part of the shell to engage inside the side walls of the second part, and snap engaging formations are provided between the tongues and inner faces of the respective side walls to releasably secure the shell parts together. For example, the projecting tongues may be provided with openings while the inside faces of the side walls of the second shell part have projections for releasable snap engagement with the openings in the tongues. Once the parts have been engaged, they cannot be simply pulled apart, but are locked together unless the side walls of the second shell part are deformed outwardly to release the projections from the openings.

This arrangement makes the two shell parts difficult or impossible to separate by manual maneuvering or using any conventional prying tool. Once the assembled shell is mounted on a wheel or caster, it will be difficult or impossible to deform the side walls of the first part inwardly by a sufficient amount to release the openings from the projections and allow the second part to be removed. Each side wall of the first shell part may have a raised boss on its inner face about the wheel axle engaging hole, reducing the gap between the wheel and the inner surface of the shell part and making it even harder to deform the sidewalls inwardly. The only way to separate the parts is to spread the side walls of the first part apart, and a special tool may be provided for this purpose, so that only authorized store personnel can remove the second part of the shell for service or replacement.

Use of the two part braking shell in a security apparatus for a shopping cart wheel will significantly reduce the need to remove casters from carts for servicing, and will dramatically reduce service support costs and time. At the same time, the locking arrangement between the two shell parts will make it very difficult, if not impossible, for unauthorized users to separate the second shell part from the first part.

In another aspect of the present invention, a braking system for use on a wheeled land vehicle incorporates a skid plate that can be quickly removed and replaced as required without dismantling the entire system. More specifically, the braking system includes a first part that is mounted on an axle of the vehicle to cover a portion of a wheel. Relative to this first part, the wheel is free for rotation on the axle. The system also includes a second part that can be selectively engaged with the first part. Structurally, the skid plate is mounted on this second part so that the first and second parts, in combination with the skid plate, create a braking shell.

As envisioned for the present invention, operational maintenance of the braking system requires a tool that can be used to selectively disengage the second part, with its skid plate, from the first part. Once the second part and its skid plate have been removed, they can then be replaced by another second part and skid plate. The tool that is used to accomplish the required disengagement is preferably a pincers having two jaws. In particular, one of the pincers' jaws has a relatively smooth concave surface, while the other has a flatter, more serrated surface. Functionally, the two jaws of the pincers cooperate with each other to grip a portion of the second part to disengage it. In this task, the gripping of the second part is facilitated and the tool is stabilized by conforming the concave surface of one jaw with a rounded convex surface of the second part.

For the operation of the braking system, both the first part and the second part of the braking shell are formed with a respective recess. Additionally, the braking system includes a locking mechanism that is mounted on the vehicle to control the respective engagement and disengagement of a pawl with these recesses. In response to this control the braking shell can be selectively moved over the wheel between a first position and a second position when the locking mechanism disengages from the braking shell. Specifically, when the pawl is disengaged from the braking shell, it rotates around the axle under the influence of a biasing spring that urges the braking shell from the first position into the second position.

In greater detail, the pawl that is controlled by the locking mechanism is positioned in the recess of the first part to hold the braking shell in its first position. In this first position, the wheel is free to contact the ground, and is thereby able to allow for movement of the vehicle. Alternatively, when the pawl is removed from the recess in the first part and is then positioned in the recess of the second part, the braking shell is locked in a second position. In this second position, the skid plate contacts the ground, to thereby lift the wheel from the ground and inhibit further movement of the vehicle.

With the above in mind, it is to be appreciated that for a normal operation of the present invention, the braking shell is held by the locking mechanism in its first position. The land vehicle (e.g. a shopping cart) can then be freely moved over the ground. When the locking mechanism is activated to remove the pawl from the recess of the second part, however, the braking shell is automatically moved to its second position. This activation causes the wheel that is associated with the locking shell to be lifted from the ground. Consequently, the skid plate on the locking shell makes contact with the ground to significantly inhibit further movement of the vehicle. As will be appreciated by the skilled artisan, activation of the locking mechanism can be accomplished in a manner disclosed in references previously incorporated herein by reference.

It happens that after a vehicle has been inhibited from free movement, it may be desirable that the vehicle be repaired and reconditioned for service. To do this, the second part of the braking shell is gripped with the above-described tool. While this grip is maintained, the tool is then pulled and twisted to disengage the second part from the first part. A new second part, with its associated skid plate, can then be engaged with first part. Preferably, this engagement is accomplished merely by snapping a new second part onto the first part. Also, at this time the pawl of locking mechanism can be positioned in the recess of the first part to hold the braking mechanism in its first position until there is a subsequent activation of the locking mechanism.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DESCRIPTION OF THE PREFERRED EMBODIMENTS

Figure 1:
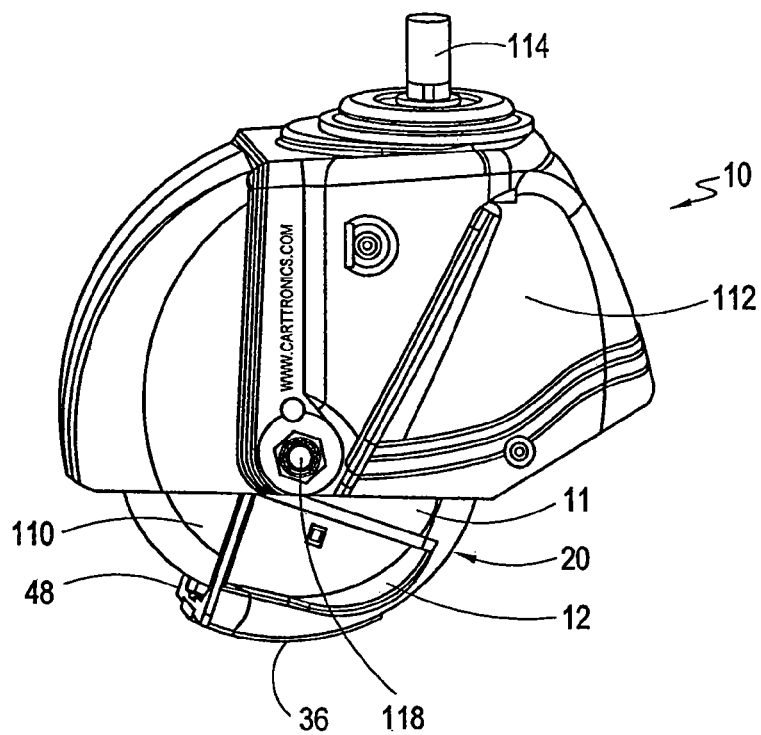
FIG. 1 is a side elevation view of a caster unit with an security apparatus including a two part shell according to an exemplary embodiment of the present invention, with the shell in the deployed, operative position.

FIG. 1 of the drawings illustrates a security apparatus 10 including a two part shell 20 according to an exemplary embodiment of the present invention which is installed on one wheel 110 of a shopping cart or other hand-driven wheeled vehicle. The conventional yoke as normally used on a caster is replaced by an enlarged yoke or housing 112 for enclosing the upper part of wheel 110 as well as the security apparatus 10 when in the inoperative, armed position. The housing 112 has a conventional stem 114 which is secured to a shopping cart body (not illustrated). The caster may be a swiveling or non-swiveling caster.

The housing 112 has opposite side walls which extend down on opposite sides of wheel 110. The wheel 110 is rotatably mounted on an axle 118 secured between the housing side walls. The security apparatus 10 within housing 112 basically comprises a braking member or shell 20 rotatably mounted on axle 118 so as to extend over a portion of the wheel 110, a locking device (not visible in the drawings) for releasably locking the shell 20 in an inoperative position in which it is raised from the ground or an operative position in which shell 20 is rotated downwardly to engage the ground and lift the wheel 110 from the ground, and a triggering module for moving the locking device so as to release the shell 20. The shell 20 may be of metal, plastic, or composite material, but is of plastic material in the exemplary embodiment. The locking device and triggering module of the security apparatus 10 in this embodiment may be the same as described in any of the embodiments of prior U.S. Pat. Nos. 5,881,846 and 6,125,972, the contents of which are incorporated herein by reference, and the locking and release mechanisms are therefore not described in any more detail here.

The main difference between the security apparatus 10 of this invention and that described in the prior patents referenced above is the placement of the one piece braking shell of the prior patents with a two piece shell 20 having a first part 11 which engages the wheel axle 118 and a second part 12 which has a metal skid plate 36 for engaging the ground when the shell 20 is in the deployed or operative position of FIG. 1.

The two-part shell 20 is illustrated in more detail in FIGS. 2 to 6. The shell 20 is designed to surround part of a wheel 110 with a gap between the inner face of the shell 20 and the wheel 110, and has an outer arcuate wall 26 (see FIG. 2) for extending around part of the outer periphery or rim of the wheel 110 on which it is mounted, and parallel side walls for extending over part of the front and rear faces of the wheel 110. Aligned openings 13 in the opposite side walls of the shell 20 are rotatably engaged over the wheel axle 118 between the wheel 110 and the housing sidewalls when the apparatus 10 is installed as in FIG. 1.

A first opening or recess 136 in the outer arcuate wall 26 of the shell 20 is engaged by a locking finger or pawl of the locking device when the apparatus 10 is in an inoperative position in which the shell 20 is raised from the ground and completely enclosed within the outer housing 112. When a customer attempts to leave a protected area around a store with the cart, the locking device will be actuated to retract the pawl from recess 136. This allows the shell 20 to rotate downwardly under the action of a biasing spring around the axle 118 (also not visible in the drawings). The biasing spring will be mounted around hub 138 and engage in groove 139 of the first shell part (FIG. 2) when the components of the security device are assembled together. The rotation continues until the shell 20 contacts the ground. After the shell 20 contacts the ground, continued forward motion of the cart will move the shell 20 into a braking position of FIG. 1 between the wheel 110 and the ground, lifting the wheel 110 from the ground and inhibiting further movement of the cart. At this position, the locking pawl will engage in a recess 137 on the outer arcuate surface 26 of the shell 20 so as to prevent a customer from rotating the shell 20 back into an inoperative position.

As illustrated in FIGS. 2 to 6, shell 20 is formed in two parts 11, 12 separable along a transverse dividing line 40 at the mating end faces 42, 44 of the first part 11 and second part 12. The first part 11 of the shell 20 is larger than the second part and includes the openings 13 in opposite side walls 45 for mounting on the wheel axle 118. The second part 12 includes the braking surface or plate 36 which engages the ground when the shell 20 is in the operative position (FIG. 1). The braking surface in this embodiment is a separate metal skid plate 36 which is mounted in a recess provided for that purpose on the outer arcuate surface 26 of the second part 12 of the shell 20, extending down to the lower edge 48 of the shell 20.

Figure 3:
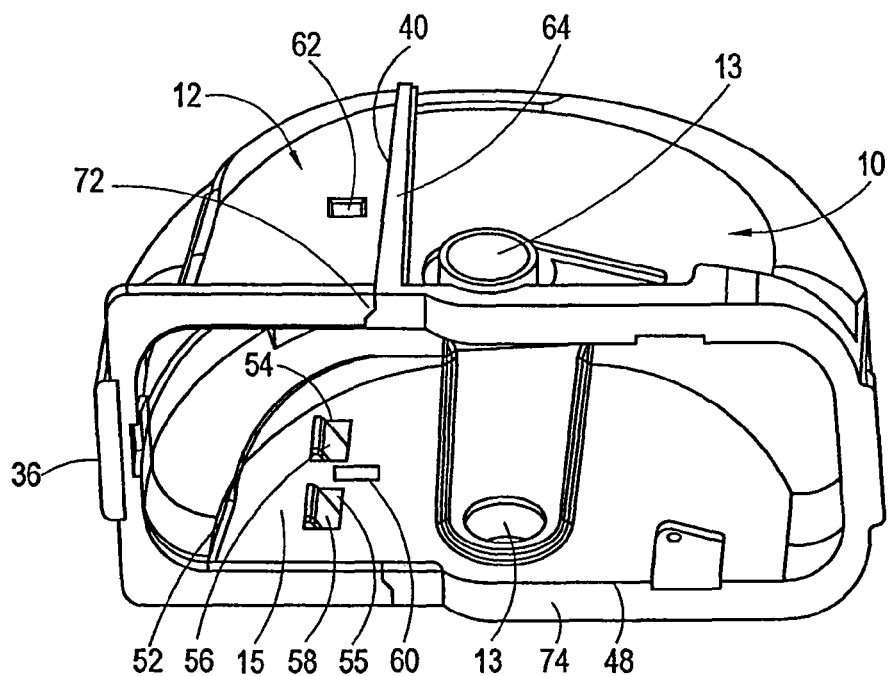
FIG. 3 is a bottom perspective view of the shell showing the internal features of the shell.
Figure 4:
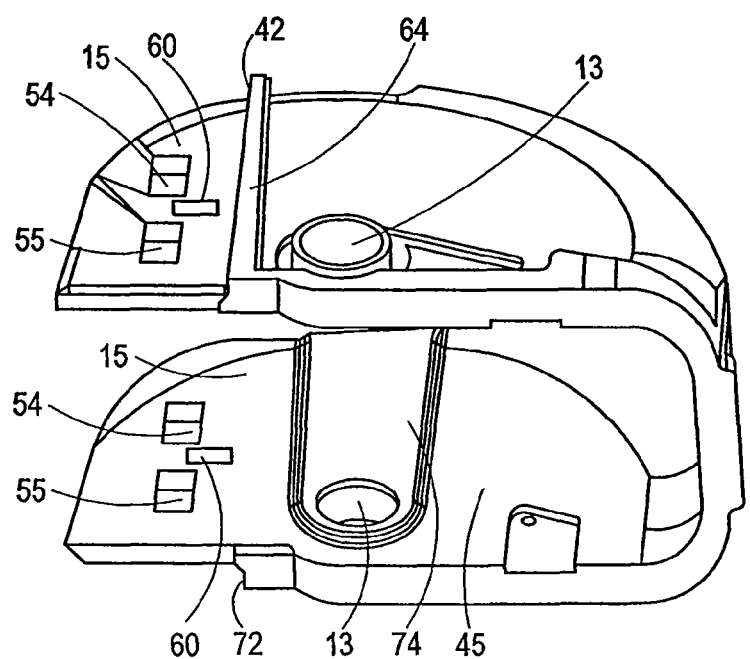
FIG. 4 is a perspective view of the first part of the shell.
Figure 5:
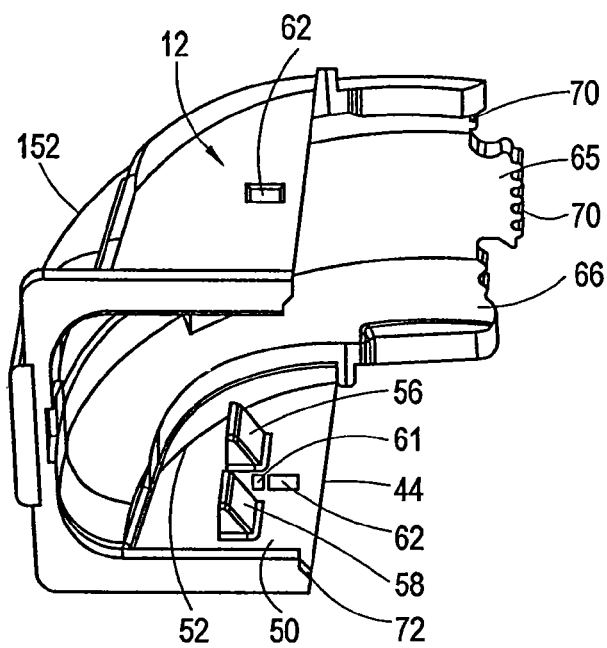
FIG. 5 is a perspective view of the second, removable part of the shell.

The first part 11 of the shell 20 has tongues 15 which project from the end face 42 of each side wall, as best illustrated in FIG. 4. The tongues 15 are designed for engagement inside the side walls of the second part 12 when the two parts are mated together. As best illustrated in FIG. 5, the side walls of the second part 12 have recesses 52 on their inner faces designed to receive the respective tongues 15. Each tongue 15 has a pair of spaced openings 54, 55 designed for snap engagement over corresponding projections or teeth 56, 58 on the inner wall of each recess 52, as best illustrated in FIGS. 3, 4 and 5, with FIG. 3 illustrating the tongues 15 fully engaged in recesses 52 with the teeth 56, 58 projecting through the respective openings 54, 55. Once the teeth 56, 58 are engaged in the openings 54, 55, the parts are locked together and cannot be separated by pulling them away from one another, due to the flat end faces of the teeth 56, 58 bearing against the end walls of the respective openings.

The tongues 15 also have a recess or opening 60 between the two openings 54, 55 (FIG. 4) which will be aligned with an opening 62 in the respective side wall 50 when the tongues 15 are engaged in recesses 52 with the openings engaged over the respective projections 56, 58. An indent 61 is provided on the inner wall of each recess 52 adjacent each opening 62, as seen in FIG. 5. A vertical rib 64 is provided on each side wall 45 of the first shell part 11 at the inner end of the respective tongue 15 for engaging the mating end face 44 of the second shell part 12 when the parts 11, 12 are mated together, as in FIG. 3.

Figure 2:
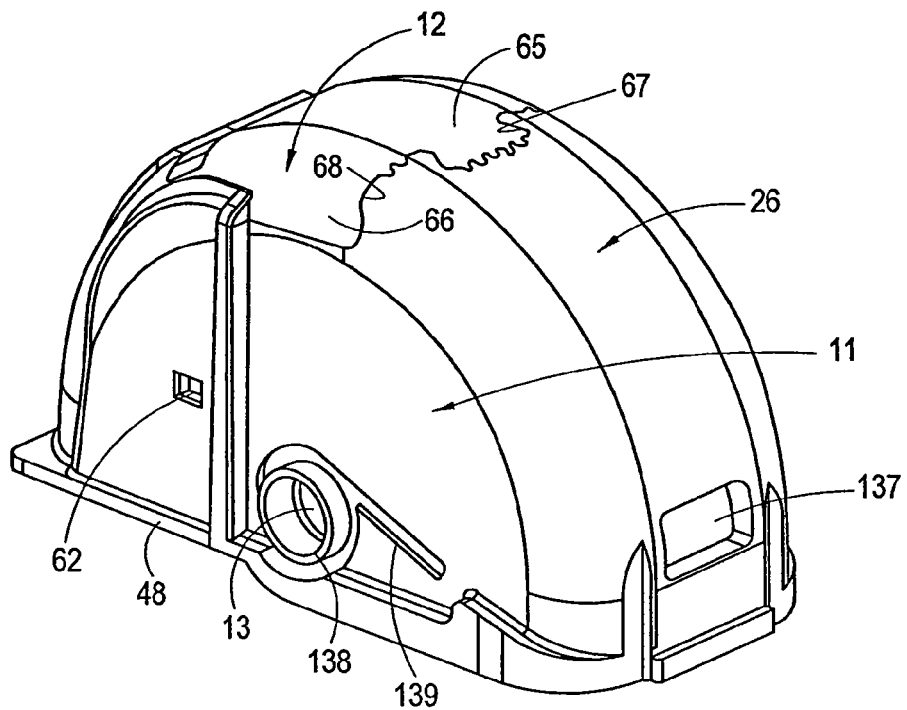
FIG. 2 is a perspective view of a two part shell according to a first embodiment of the invention.
Figure 6:
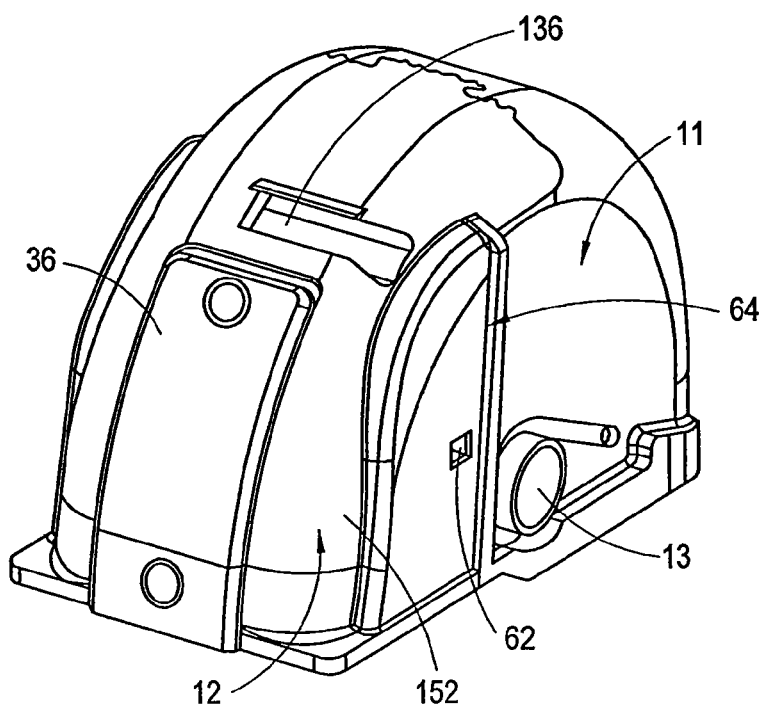
FIG. 6 is a perspective view of the two parts of the shell from a different direction.

As can be seen in the drawings, the dividing line 40 between the two shell parts 11, 12 is not straight. It extends first in a generally straight line from the lower edge 48 of the shell 20 up each side wall, but has zigzags or jogs as it extends over the upper portion of each side wall and across the upper surface of the shell 20, with an overall jigsaw puzzle piece appearance, as best illustrated in FIGS. 2, 5 and 6. As best illustrated in FIG. 5, the mating end face 44 of the second shell part 12 has a central projecting tab 65 and a projecting ear 66 on each side of the tab 65. The first shell part 11 has a central indent 67 for mating engagement with tab 65, and indents 68 spaced from opposite ends of indent 67 for receiving the ears 66. By having a non-straight, more tortuous dividing line between the two shell parts 11, 12, the risk of someone being able to insert a tool to separate the parts is reduced. The mating end faces of the two shell parts 11, 12 may also be serrated or corrugated along at least part of the dividing line for added security. In the illustrated embodiment, each end face on the upper part of the shell has corrugated edge portions 70. The joining line between the parts also has a jog or step 72 in the lower edge 48, as best illustrated in FIGS. 3, 4 and 5. Since there is no exposed straight seam between the two shell parts 11, 12 (the seam along the side walls is immediately adjacent rib 42 which will restrict prying), it will be very difficult, if not impossible, to insert a prying tool between the mating end faces in order to attempt to separate them. This reduces the risk of a customer attempting to circumvent the braking action by prying off the second part 12 of the shell 20 which carries the skid plate 36.

As best illustrated in FIGS. 3 and 4, the first part 11 of the shell 20 may also be provided with a raised boss or thickened wall portion 74 on its inner face which faces the wheel 110 when the shell 20 is installed on the wheel 110. This will reduce the gap between the wheel face and the inner face of shell part 11, resisting deformation of the shell side walls in an attempt to release the openings 54, 55 from projections 56, 58.

Figure 7:
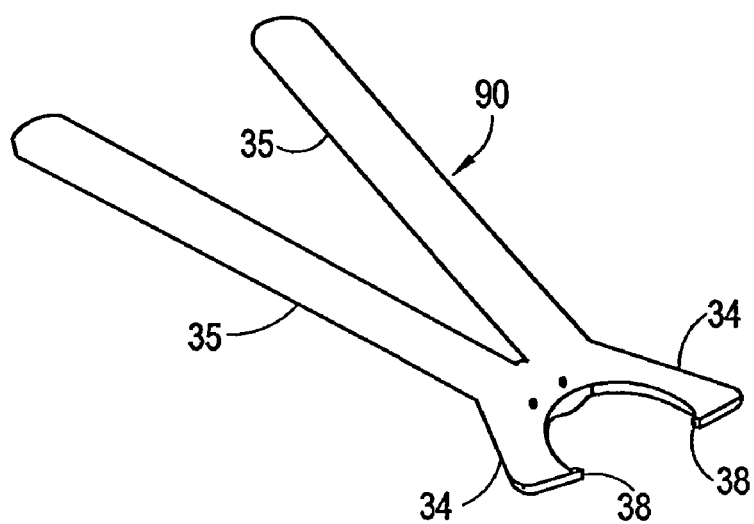
FIG. 7 is a perspective view illustrating a special tool according to another aspect of the invention for use in separating the shell parts.
Figure 8:
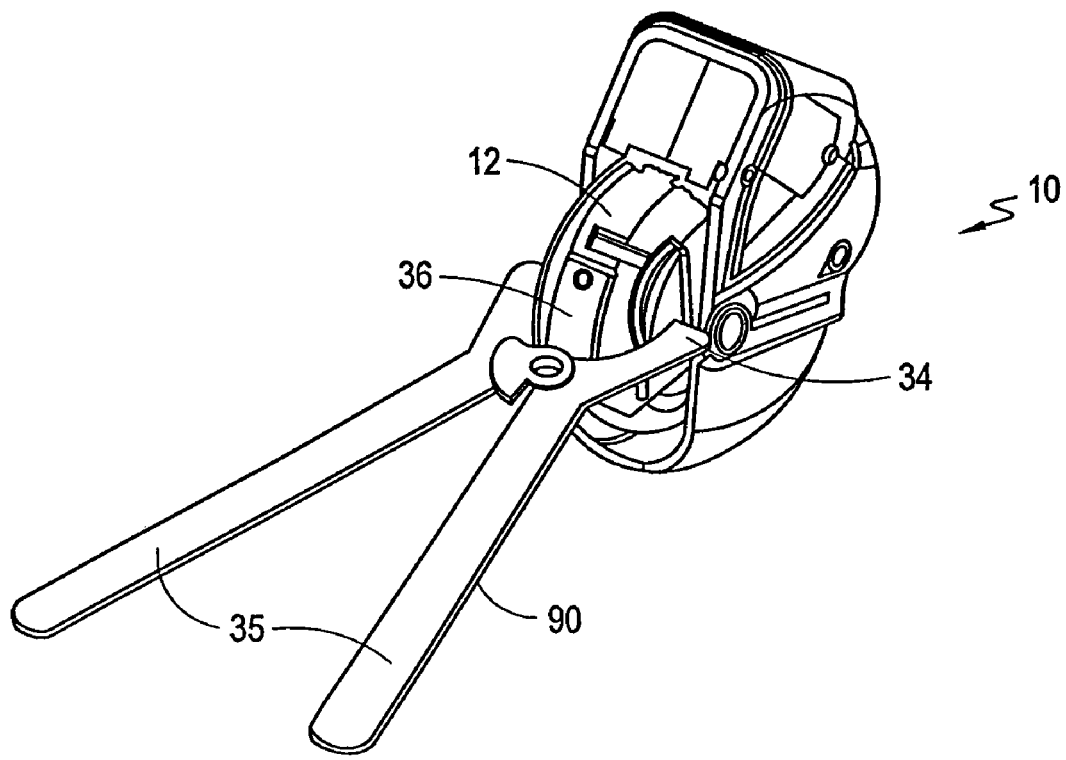
FIG. 8 is a perspective view illustrating the tool of FIG. 7 engaging the removable part of the shell.
Figure 9:
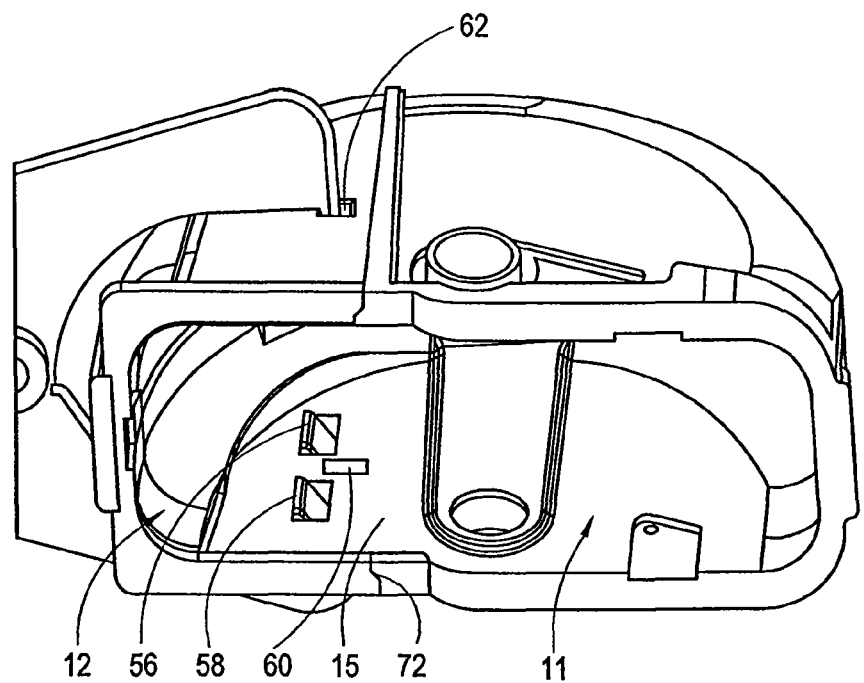
FIG. 9 is another view of the tool engaging the removable part of the shell.
Figure 10:
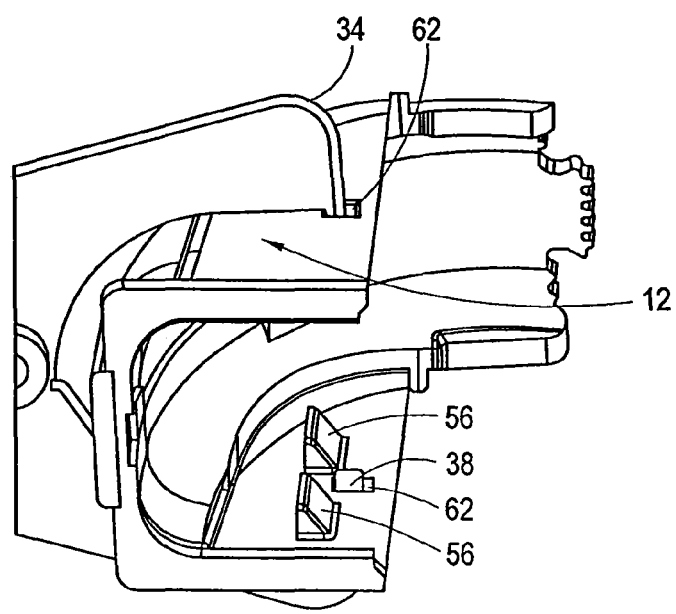
FIG. 10 is a view similar to FIG. 9 showing the removable part after removal from the first part of the shell and still engaged with the jaws of the removal tool.

With this arrangement, a special tool is required to remove the second part 12 of the shell 20 from the first part 11. A suitable tool 90 for this purpose is illustrated in FIG. 7, and is shown in use in FIGS. 8 to 10. The tool 90 has opposing jaws 34 with hooked ends 38 which are operated in a scissors-like fashion by handles 35 in order to move the jaws 34 towards or away from one another. When the two shell parts 11, 12 are secured together as in FIG. 3, the openings 62 in the opposite side walls of the second shell part 12 are aligned with recesses or openings 60 in the projecting tongues 15 of the first shell part 11. Openings 60 are of larger dimensions than the openings 62 to leave a clearance or gap behind the ends of the openings to provide clearance for the hooked ends 38 of jaws 34. The hooked ends 38 engage in the openings or recesses 61 adjacent each opening 62, as illustrated in FIG. 10.

In order to separate the shell parts, the handles 35 are first urged towards one another to spread the jaws 34 apart, and the tool 90 is positioned with the claws on opposite sides of the second shell part 12 and aligned with the respective openings 62. The handles 35 are then closed toward each other so that the jaws 34 extend through the openings 62, and moved so that the hooked ends 38 engage in the openings 61, as illustrated in FIG. 10. The handles 35 are then squeezed together, causing the side walls 50 of the second shell part 12 to spread apart so that the projections 56, 58 are clear of the openings 54, 55 and the shell part 12 can be removed (FIGS. 9 and 10).

The two part shell of this invention allows a second part of the shell on which the braking surface is located to be removed from the first part which is mounted on the shopping cart or wheel when service or replacement is required. Previously, on security devices having a one piece shell, the entire caster had to be removed when the braking surface of the shell became worn. The locking arrangement between the two shell parts is designed such that it cannot be readily circumvented by unauthorized users, in view of the wavy mating surfaces between the two shell parts which impede insertion of prying tools, and the rigidity of the side walls of the first shell part which resist inward deformation. At the same time, authorized store personnel with the specialized tool can remove the second shell part quickly and easily as required for service or maintenance.

Figure 11:
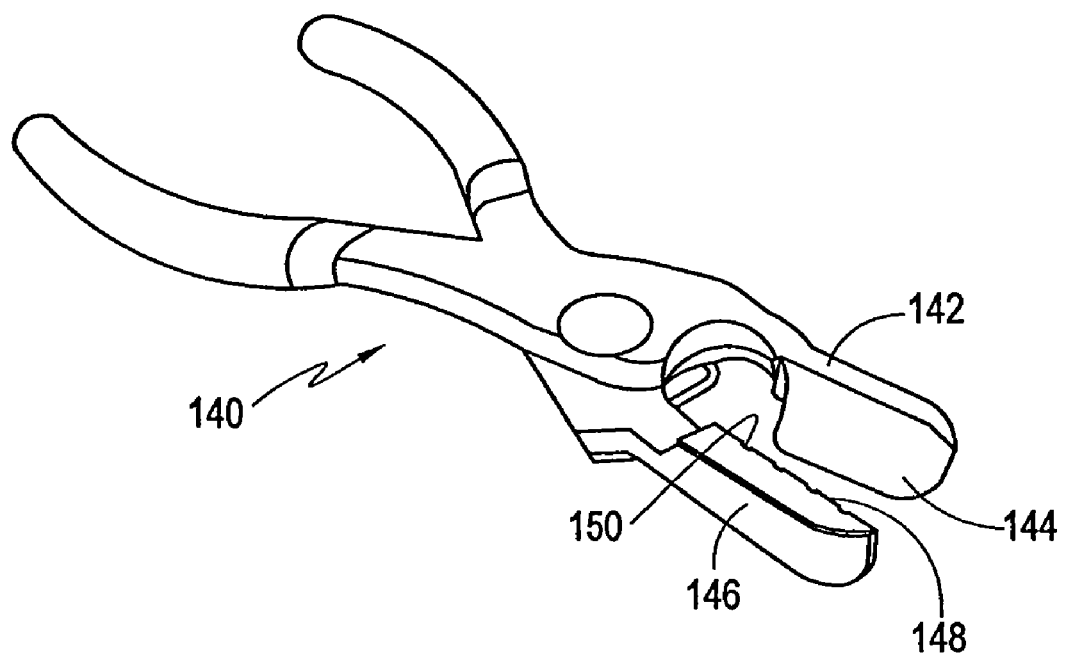
FIG. 11 is a perspective view of a tool for use in repairing the system of the present invention.

Referring now to FIG. 11, a pincers (tool) for use in removing the skid plate 36 from the first part 11, is shown, and is generally designated 140. As shown, the pincers 140 includes a jaw 142 that is formed with an elongated, generally smooth surface 144. Further, as shown, the surface 144 is substantially concave. FIG. 11 also shows that the pincers 140 includes a second jaw 146 that is formed with a surface 148. In this instance, the surface 148 is generally flat and is preferably formed with a plurality of serrations 150.

By cross-referencing FIG. 11 with FIG. 6, it is to be appreciated that the purpose of the pincers 140 is for use in disengaging the second part 12 of apparatus 10 from the first part 11 of the apparatus 10. To do this, as will be best appreciated with reference to FIGS. 5 and 6, the concave surface 144 on jaw 142 of the pincers 140 is positioned against the rounded portion 152 of the second part 12. The flat, serrated surface 148 of jaw 146 is then positioned to locate the portion 152 of second part 12 between the jaws 142, 146. With the pincers 140 so positioned, the pincers 140 are used to grip the second part 12. In this action, the conformance of surface 144 with portion 152, and the interaction of the serrations 150 with the second part 12 help to stabilize the pincers (tool) 140. Specifically, this stabilization facilitates the application of a force on the second part 12 that will disengage it (the second part 12) from the first part 11. A new first part 11, with associated skid plate 36, can then be engaged with the first part 11 for further use in the operation of a vehicle (not shown).

Although an exemplary embodiment of the invention has been described above by way of example only, it will be understood by those skilled in the field that modifications may be made to the disclosed embodiment without departing from the scope of the invention.

While the particular braking system as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A braking shell system for a land vehicle where the vehicle has a wheel mounted thereon for rotation about an axle, the braking shell system comprising:
   a first part formed with an arcuate surface and having a pair of opposed side walls extending therefrom substantially parallel to each other, wherein the sidewalls are oriented substantially perpendicular to the axle and are engaged with the axle to position the first part over a portion of the wheel, and wherein each side wall is formed with a tongue having a side opening and an engagement opening, with each engagement opening having a first dimension, and further wherein the arcuate surface of the first part is formed with a wavy edge at a radial distance from the axle; and
   a second part formed with an arcuate surface and having a pair of substantially parallel opposed side walls extending therefrom, wherein the sidewalls are oriented substantially perpendicular to the axle and wherein each side wall is formed with a projection for selective insertion into the side opening on a respective tongue of the first part to hold the side wall of the second part against the tongue of the first part, and wherein each side wall of the second part is formed with an engagement opening having a second dimension smaller than the first dimension of the first part engagement opening to establish a clearance between the engagement opening of the first part and the engagement opening of the second part when the respective engagement openings are aligned with each other, and further wherein the arcuate surface of the second part is formed with a wavy edge for a mating engagement with the wavy edge of the first part to create an integrated arcuate surface for the braking shell.

2. A system as recited in claim 1 further comprising:
   a plurality of side openings formed on the first part; and
   a respective plurality of projections formed on the second part.

3. A system as recited in claim 1 wherein the integrated arcuate surface of the braking shell extends through an arc of approximately one hundred and eighty degrees.

4. A system as recited in claim 1 further comprising a tool with a pair of hooked ends, wherein the hooked ends of the tool, when inserted through the aligned engagement openings of the first and second parts for engagement with the clearance, are manipulated to spread the sidewalls of the second part away from the tongues of the first part to withdraw the projections on the second part from the side openings of the first part to separate the second part from the first part.

5. A system as recited in claim 1 wherein the first part and the second part are made of plastic.

6. A system as recited in claim 1 further comprising a braking plate mounted on the arcuate surface of the second part.

* * * * *